United States Patent Office 2,937,069
Patented May 17, 1960

2,937,069
METHOD OF TREATING FILTERS

James H. Zoellner, Lakeland, Fla., assignor to International Minerals & Chemical Corporation, a corporation of New York No Drawing. Application September 29, 1955
Serial No. 537,590

5 Claims. (Cl. 8—137)

This invention relates to the processing of water-soluble phosphates. Still more particularly, it relates to a novel method of maintaining filters for phosphate solutions in good operating condition.

Many modifications of processes for the recovery of water-soluble phosphates are known. These processes generally start with an acidification step in which phosphate rock is reacted with aqueous solution of sulfuric acid. If the product is wet process phosphoric acid the rock-acid product is a dilute aqueous slurry from which the insoluble material is readily separated by filtration.

Materials of construction for separating the insolubles from the strongly acidic phosphate solutions have presented numerous problems. Large numbers of natural and synthetic fiber cloths have been investigated as filter cloths. Utilizing natural fibers and some synthetic fiber cloths, such as Saran mono-filament cloth, filter operations could be maintained at a high thruput rate recovering a 20% to 30% $P_2O_5$ solution only for about 24 to 48 hours after which the filter rate fell off due to accumulation of solid material on the filter fibers and in the interstices of the woven cloth. This solid material has at various times been identified as calcium sulfate anhydrite or dihydrate or mixtures thereof. When the filters became inoperative or blinded, the filter cloths have been treated with nitric acid, together with mechanical scrubbing to slowly remove the accumulated solids.

Upon substitution of filter cloth made of polyethylene monofilament fibers for materials previously used, the operating time at commercially feasible filtration rates was appreciably lengthened so that acid treating to unblind the filters was only necessary once in about 150–200 operating hours. Once blinded, however, the filters responded poorly to methods of dissolving solids previously in use, increasing the time of suspended operation with its consequent increase in operating cost.

It is a primary object of this invention to overcome the disadvantages and shortcomings of operating procedures currently in use.

It is another object of this invention to provide an improved method for rapidly restoring blinded polyethylene filter cloths to operating condition.

It is a further object of this invention to provide a method of dissolving accumulated solids from polyethylene cloths rapidly and without attrition and wear due to mechanical scrubbing.

These and other objects of the invention will be apparent to those skilled in the art from the following description.

Now it has been discovered that contrary to widely held belief, gypsum is only a minor constituent of the accumulated solids by means of which polyethylene monofilament filter cloths become blinded when filtering phosphoric acid solutions. Present also is some silica and usually 10% or more of calcium sulfate anhydrite When filtering predominantly phosphoric acid solutions, a higher proportion of the accumulated solid material is calcium sulfate dihydrate.

In the new and novel process of this invention, partially or wholly blinded sectors of a filter covered with polyethylene monofilament cloth may be treated in one of two ways. Either the sectors are removed from the filters for treatment in a separate treating tank or if the filter is not badly blinded, the filter pan is drained of phosphoric acid slurry and the filters cloths treated in situ. If being treated in situ, the filters are washed with water to remove loose solids and dilute hydrofluoric acid solution is introduced into the filter pans. The filters are then rotated as in normal operations or if desired, the operation of the filter may be reversed and solution introduced by means of the equipment normally used to remove filter liquor in a back washing operation through the filter into the filter pan. This hydrofluoric acid solution is circulated in contact with the polyethylene monofilament filter cloth for any desired period of from 30 minutes to 8 hours, depending upon the degree of blinding at the time the filter was taken out of operation.

The solution used to unblind the filters is the aqueous acidic solution of fluorine obtained by absorbing fluorine containing gases such as those discharged in the concentration of phosphoric acid, as described for example in Strathmeyer U.S. Pat. 2,141,773 (December 27, 1938), or such as the so-called "den gases" discharged or during phosphate rock acidulation in which the phosphate rock is treated with an acid which is either sulfuric acid or phosphoric acid (see Waggaman, "Phosphoric Acid, Phosphates and Phosphatic Fertilizers," New York: Reinhold, second edition (1952), pages 256–260, 279, and 194. The fluorine concentration of these aqueous acidic solutions usually vary from about 1 to about 4 percent. While high fluorine concentrations are effective, corrosion of equipment, particularly at elevated temperatures, does not make their use desirable. Concentration of phosphoric acid in the acidic fluorine solutions may vary over a much wider range, i.e., 1%–10%.

If the sectors are removed to separate treating tanks, the blinded sectors are replaced with reconditioned sectors and the filter allowed to remain on stream. The blinded sectors are washed with water to remove loose solids, placed in specially designed racks, and immersed in an aqueous hydrofluoric acid solution. This solution is recirculated through each sector in the reverse direction of the filtrate flow during operation. One to four hours in the hydrofluoric acid solution is required for polyethylene monofilament cloths which remained in operation until the filtration rates fell to approximately 30% of the rates experienced with new cloth. Extended submersion time is required for severely blinded cloth. Operation of the filters after the filter cloths have blinded to a degree resulting in rates of less than 30% is not recommended. The blinding material lodged in the interstices of the cloth begin to cause appreciable wear on the fibers during the continuous flexing experienced in normal operation of the filter.

Agitation and elevated temperatures increase the speed of dissolution of blinding material and its removal in water soluble form. Solutions are generally maintained during the treatment period at temperatures in the range of between about 50° C. and about 90° C., preferably between about 80° C. and about 90° C.

The invention will be more fully understood from the following examples which are given by way of illustration and without any intention that the invention be limited thereto.

Example I

In the production of wet process phosphoric acid, 68 BPL rock was wetted with weak phosphoric acid from the four stage countercurrent leach and filtration circuit. This slurry was added to the No. 1 digester along with 93.2% sulfuric acid and agitated for at least one and a half hours. The mix overflowed to digester No. 2 where additional sulfuric acid was added. The final ratio of rock to acid was 26.3 tons of 68 BPL rock to 23.5 tons of 93.2% $H_2SO_4$. The slurry overflowed to a third digester resulting in an overall retention time of not less than six hours. The corrected free sulfuric acid was maintained at greater than 0.5% in the final slurry.

The slurry was then filtered in a four stage filtration circuit. The temperature of the slurry was always less than 170° F.

The filters were removed from service every eight to twelve hours and washed with water to remove crystals of gypsum which had lodged in the interstices of the polyethylene monofilament cloth. Once each week, the filter pan was filled with fluorine liquod from the scrubbers in the phosphoric acid concentration step and prepared as follows: Phosphoric acid solution of 26% $P_2O_5$ was concentrated to approximately 50% using a submerged combustion evaporator. The vapors discharged from the concentrate consisting of water, phosphoric acid, some sulfuric acid, some HF, and silicon tetrafluoride were passed counter-current to water through a tower so as to absorb fluorine and phosphoric acid to produce an aqueous solution containing approximately 3% HF and approximately 3% phosphoric acid. This liquor was used to treat the filter cloth in situ and it removed accumulated buildup on the filter cloths in about two hours which the frequent water washes failed to remove. At the same time, the liquor attacked the scale on the inside of the trunnion pipes and the filtrate lines.

Example II

Filters which have been treated as in Example I were restored to service and given the standard treatment of removal from service every eight to twelve hours and washing with water. At the end of one week the filters were determined to be in substantially the same condition, i.e., blinded to the point of requiring acid treatment. The phosphoric acid slurry was removed from the filter pan and the filters washed with water. The filter pan was then filled with nitric acid solution of approximately 5% by weight $HNO_3$. The filters were held in this liquor for approximately twenty-four hours. At the end of this time the filters were visually inspected and found to be still blinded to the point where unsatisfactory operation would be obtained if the filter was restored to service. Nitric acid was withdrawn from the tank and the filter treated as in Example I.

Comparison of the results obtained in Examples I and II show that the hydrofluoric acid solution is markedly superior to the nitric acid treatments heretofore in use.

Having thus described by invention, what I claim is:

1. A method of restoring the permeability of blinded polyethylene fiber filter cloth used for separating insolubles from wet process phosphoric acid produced by acidulating and digesting phosphate rock with a mineral acid selected from the group consisting of sulfuric acid and phosphoric acid, and filtering the digested reaction mixture, in which the filter cloth is blinded with insoluble calcium sulfate dihydrate, calcium sulfate anhydrite, and silica, which comprises immersing said blinded cloth in an aqueous acidic solution containing hydrofluoric acid, said solution being selected from the group consisting of (1) an aqueous solution containing hydrofluoric acid formed by absorping in water den gases produced by acidulation of phosphate rock with an acid selected from the group consisting of sulfuric acid and phosphoric acid, and (2) an aqueous solution containing hydrofluoric acid formed by absorbing in water vapors evolved during the concentration of wet process phosphoric acid by evaporation of water therefrom, said immersion being continued for a period of between about 30 minutes and about 4 hours, until the insoluble materials are dissolved and the filter action of the filter cloth is restored.

2. A process as in claim 1 wherein said immersion of said blinded filter cloth is effected at a solution temperature between about 50° C. and about 90° C.

3. A method of restoring the permeability of blinded polyethylene monofilament fiber filter cloth used for separating insolubles from wet process phosphoric acid produced by acidulating and digesting phosphate rock with a mineral acid selected from the group consisting of sulfuric acid and phosphoric acid, and filtering the digested reaction mixture, in which the filter cloth is blinded with insoluble calcium sulfate dihydrate, calcium sulfate anhydrite, and silica, which comprises immersing said blinded cloth in an aqueous acidic solution containing hydrofluoric acid at a fluorine concentration of between about 1% and about 4% and selected from the group consisting of (1) an aqueous solution containing hydrofluoric acid formed by absorbing in water den gases produced by acidulation of phosphate rock with an acid selected from the group consisting of sulfuric acid and phosphoric acid, and (2) an aqueous solution containing hydrofluoric acid formed by absorbing in water vapors evolved during the concentration of wet process phosphoric acid by evaporation of water therefrom, said solution having a temperature between about 50° C. and about 90° C., said immersion being continued for a period between about 30 minutes and about 4 hours, and water washing the treated filter cloth free of aqueous hydrofluoric acid solution, whereby the insoluble materials are dissolved and the filter action of the filter cloth is restored.

4. A process as in claim 3 wherein the aqueous hydrofluoric acid solution is formed by absorbing in water den gases produced by acidulation of phosphate rock with an acid selected from the group consisting of sulfuric acid and phosphoric acid.

5. A process as in claim 3 wherein the aqueous hydrofluoric acid solution is prepared by absorbing in water vapors evolved during the concentration of wet process phosphoric acid by evaporation.

References Cited in the file of this patent

UNITED STATES PATENTS

| | | |
|---|---|---|
| 2,198,847 | Volz | Apr. 30, 1940 |
| 2,666,001 | Marshall | Jan. 12, 1954 |

OTHER REFERENCES

Lange: "Handbook of Chem.," 7th ed., pp. 198–201, pub. by Handbook Publ. Inc., Sandusky, Ohio (1949).

Chem. Eng., "Corrosion Forum," vol. 59, No. 10, October 1952, p. 266.

Lange: "Handbook of Chem.," 6th ed., pp. 178–181. pub. by Handbook Publ., Inc., Sandusky, Ohio (1946).